Feb. 17, 1959 E. T. LOOMIS 2,873,809
CULTIVATING TOOL
Filed July 5, 1955
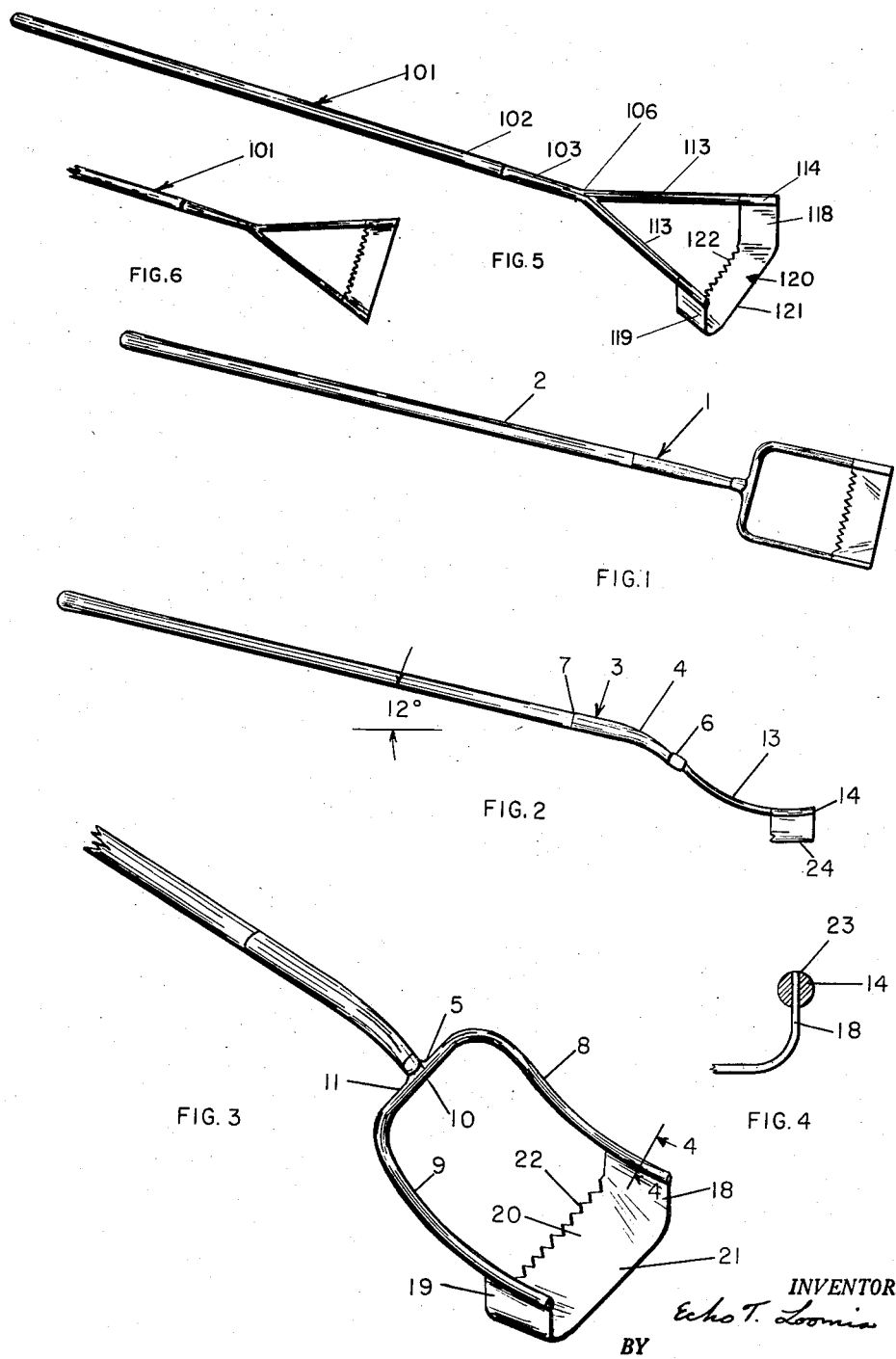
INVENTOR.
Echo T. Loomis
BY
Charles L. Lorenbeck
attorney

United States Patent Office 2,873,809
Patented Feb. 17, 1959

2,873,809
CULTIVATING TOOL
Echo T. Loomis, Erie, Pa.
Application July 5, 1955, Serial No. 519,859
2 Claims. (Cl. 172—376)

This invention relates to garden or lawn implements and more particularly to tools adapted for use in cultivating and weeding the soil in flower beds and gardens and edging the sod around flower beds, shrubs, and the like.

Specifically, an object of this invention is to provide a garden tool which is simple in construction, economical to manufacture, and efficient and easy to use.

Another object of the invention is to provide a garden tool for cultivating the soil in flower beds, shrubs, etc. and for shaping and edging the sod around the same wherein a transversely extending blade is disposed at a convenient angle to a handle attached by means of two resilient tine members.

A further object of this invention is to provide a tool which will cultivate the soil beneath the roots of weeds, grass, etc., thereby completely dislodging the weeds so that they can be either cultivated into the soil or raked out by means of the deep notched edge of the blade opposite the cutting edge.

Another object of the invention is to combine in one tool the work of cultivating, weeding, raking, and edging.

Another object of this invention is to provide a tool which takes the place of a hoe, rake, and edging tool and which does the work much faster and easier than these tools.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

In the drawing:
Fig. 1 is a top view of a garden and lawn tool according to the invention;
Fig. 2 is a side view of the tool shown in Fig. 1;
Fig. 3 is an isometric view of the tool shown in Figs. 1 and 2;
Fig. 4 is a cross sectional view taken on line 4—4 of Fig. 3;
Fig. 5 is a perspective view of another embodiment of the invention; and
Fig. 6 is a top view of the embodiment of the invention shown in Fig. 5.

Now with more specific reference to the drawing, a tool 1 is shown having a handle 2. A shank or tubular portion 3 is curved at 4 and bends downwardly and is attached to bifurcated tine portions at 5. A ferrule 6 is provided around the end of the tubular member 3 to strengthen it. The handle 2 is received in the socket portion of the shank 3 at 7 and rigidly attached thereto.

Resilient tines 8 and 9 are integrally attached together at 10 and extend outwardly generally perpendicular to the tubular portion 3 at 11 whereby a generally horizontal portion is provided for the operator to set his foot upon to obtain additional pressure during the process of edging sod around flower beds, shrubs, etc. The tines 8 and 9 extend parallel to the ends of the tubular portion 5 and then curve gently upwardly at 13 and terminate at distal ends 14 which receive upturned ends 18 and 19 of a blade 20. The blade 20 has a sharpened edge 21 and deep notches are formed in the opposite edge at 22 to provide a raking edge. The leading or cutting edge 21 and the deep notched edge 22 are both sharpened so that the tool 1 will positively cut through any weeds or grass roots which are not completely uprooted in the cultivating process, as well as breaking up hard and packed soil. The notched edge 22 may be blunt, however, to provide a more effective raking action. The ends 18 and 19 may be attached to the ends 14 of the tines 8 and 9 by forming a slot 23 in the ends of each tine 8 and 9 and inserting the ends 18 and 19 of the flat blade member 20 in the slot cut in the tine and then attaching the blade 20 to the slot by welding, brazing, soldering, or any well known fastening means. The blade 20 could be attached to the ends of the tines 8 and 9 by attaching it to the periphery of the tines 8 and 9 or in any other desired manner.

To operate, the operator grasps the handle 2 and holds it at a convenient angle from the ground with the lower surface 24 of the blade 20 generally parallel to the ground. The relation of the blade and angle of the handle makes it possible to drive the blade through the ground with the handle at a convenient angle to the ground. Then, on the forward stroke when the operator pushes the blade 20 away from him, he may lift the handle 2 slightly to cause the front cutting edge 21 of the blade 20 to bite into the ground if it is desired to cut the soil at a greater depth. Otherwise, the operator has merely to exert a slight downward pressure at an intermediate point on the handle 2 and move the blade 20 back and forth through the soil. In so doing, weeds, grass, and other obnoxious plants will be uprooted or cut and the soil will be pulverized.

To rake out any weeds or grass which is now loose in the soil and which it is desired not to cultivate into the soil, the operator merely inclines the cutting edge 21 upwardly by lowering the handle 2 which brings the notched edge 22 into operation to rake out any weeds which remain on the surface.

In edging sod and the like, the handle 2 can be held at a steeper angle to the ground whereby the surface 24 will be generally perpendicular to the ground or at a slight angle. The operator can then set his foot on the horizontal portion 11 and force the cutting or leading edge 21 through the sod to cut it off smoothly and taper it in the desired manner.

In order to obtain best results, the straight portion of the handle 2 should be disposed at an angle of between ten and thirty degrees, preferably at an angle of about twelve degrees. If the angle is decreased substantially below this amount, the operator will have to stoop too low and the ground will interfere with the operation of the handle 2. If the angle is increased substantially above this amount, the tool 1 will be difficult to hold since the operator will have to hold the handle 2 relatively high. With a curved handle and curved tines, the handle 2 may be attached to the blade 20 at an angle so that the blade 2 will be generally horizontal to the ground surface and the blade 20 can be rocked on a backward stroke to incline the edge 21 toward the ground and, on the forward stroke, to incline the edge 22 toward the ground to facilitate pulverizing the soil and raking out weeds and to provide slightly more draft into the ground.

Figs. 5 and 6 show another embodiment of the invention wherein a handle 102 has a trunk 103 receiving the end of handle 102 with bifurcated tines 113 which diverge outwardly and upwardly. A plate like blade member 120 has upturned ends 118 and 119 which terminate in the portion attached to the tines 113 at 114. One edge 122 of the blade 120 has notches formed therein. The opposite edge 121 is sharpened to form a cutting edge. It will be noted that the upturned edges diverge parallel to the tines 113 and the handle 102 may be bent upwardly at 106 or it could be bent in the manner shank 3 in Fig. 2 is bent to form a convenient working angle. Also, tines 113 could be bent in the manner tines 8 of Fig. 3 and Fig. 4 are bent.

The foregoing specification sets forth the invention in its preferred practical forms but the structure shown is capable of modification within a range of equivalents without departing from the invention which is to be understood is broadly novel as is commensurate with the appended claims.

The embodiment of the invention in which an exclusive property or privilege is claimed are defined as follows:

1. A cultivating and edging tool comprising a blade having a generally straight plate like intermediate portion with the ends turned upwardly, and two tines attached to a handle and extending therefrom, first outwardly diverging from each other at right angles to said handle to form a foot engaging portion, then bent at right angles and extending in generally parallel relation to each other, said upturned ends of said blade being attached to the distal ends of said tines remote from said handle, said handle being disposed at an acute angle to said intermediate portion of said blade, said handle having a straight portion adapted to be held by an operator, said handle curving downwardly toward said tines, said tines curving upwardly and terminating in end portions disposed generally parallel to the intermediate part of said plate and attached to said blade ends whereby said tines absorb shocks resulting from said blade engaging solid objects in use, the edge of said plate remote from said handle comprising a cutting edge extending from one said upturned end to the other, and spaced notches formed in the edge of said plate opposite said cutting edge and adjacent said handle defining teeth therebetween.

2. The tool recited in claim 1 wherein said upturned ends of said blade are disposed in slots in the ends of said tines and fastened in said slots.

References Cited in the file of this patent

UNITED STATES PATENTS

| | | |
|---|---|---|
| 1,334,586 | Baker | Mar. 23, 1920 |
| 1,500,271 | Rumbaugh | July 8, 1924 |
| 2,079,879 | Schluter | May 11, 1937 |
| 2,237,988 | Halvorsen | Apr. 8, 1941 |

FOREIGN PATENTS

| | | |
|---|---|---|
| 126,118 | Great Britain | Oct. 26, 1918 |